May 6, 1930.   F. G. HALBIG   1,757,769
WINDSHIELD
Filed Feb. 2, 1929
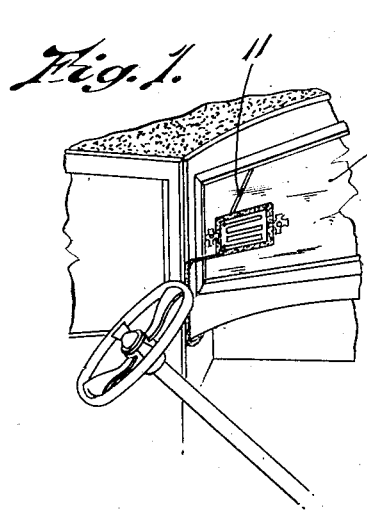
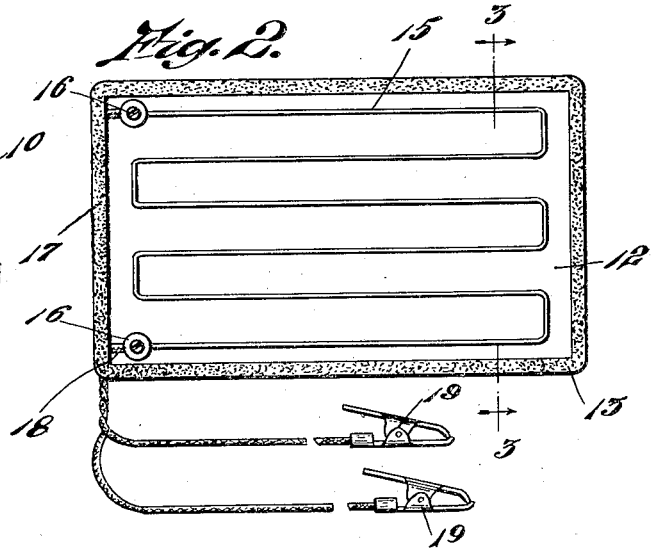
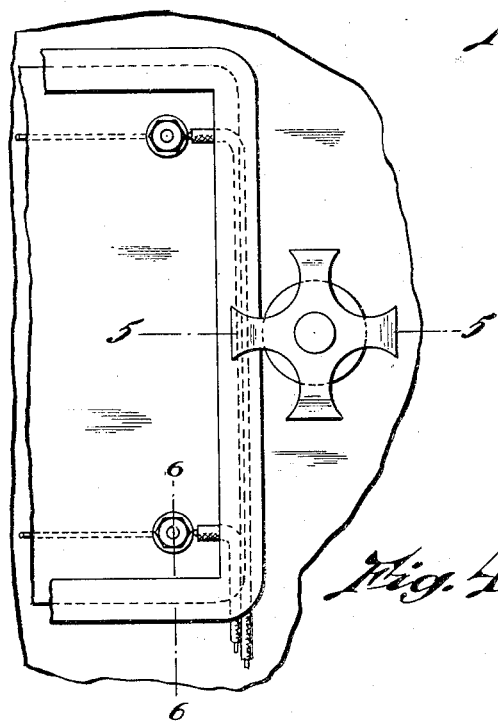
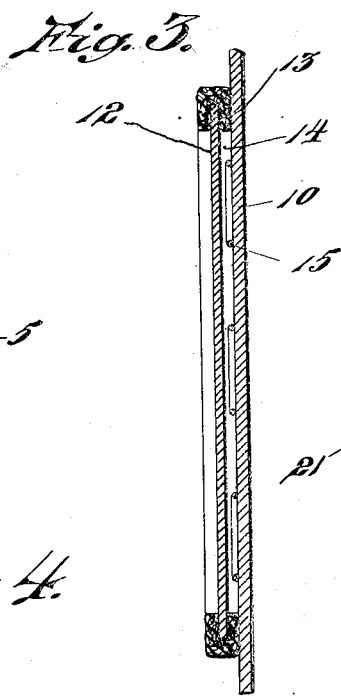
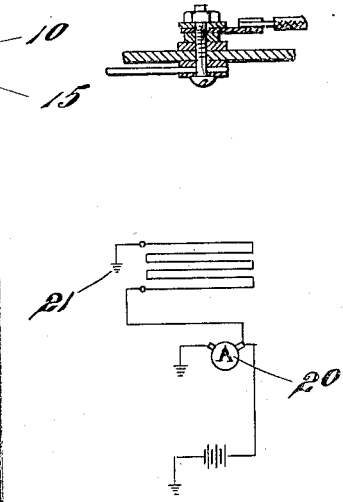
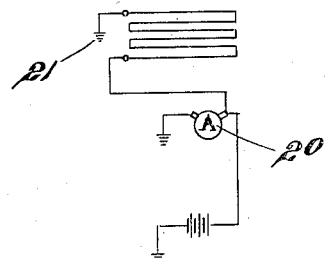
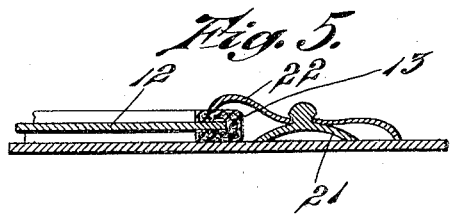
INVENTOR.
Frederick G. Halbig.
BY Barlow & Barlow
ATTORNEYS.

Patented May 6, 1930

1,757,769

UNITED STATES PATENT OFFICE

FREDERICK G. HALBIG, OF CHEPACHET, RHODE ISLAND

WINDSHIELD

Application filed February 2, 1929. Serial No. 336,954.

This invention relates to a windshield attachment and has for its object to prevent the forming of ice on the outer surface of a sheet of glass such as an automobile windshield to obstruct the vision of the driver.

A further object of the invention is to prevent the formation of ice on the windshield by heating a portion of the windshield of a sufficient area to permit clear vision thru the portion over which the common windshield wiper operates.

A further object of the invention is the preventing of the heating element from being quickly cooled by providing a compartment to house the same.

With these and other objects in view, the invention consists of certain novel features of construction, as will be more fully described, and particularly pointed out in the appended claim.

In the accompanying drawings:

Fig. 1 is a perspective view of a portion of an automobile with my ice-preventing attachment in position on the windshield.

Fig. 2 is a face view of the attachment.

Fig. 3 is a section on line 3—3 of Fig. 2.

Fig. 4 is a fragmental view of the device showing the suction cup for securing the device in position on the inner surface of the windshield.

Fig. 5 is a section on line 5—5 of Fig. 4 thru the suction cup and showing the same as attaching the device in position.

Fig. 6 is a section on line 6—6 of Fig. 4.

Fig. 7 is a diagrammatic view illustrating the method of connecting the device for operation to the ammeter of an automobile and the ground.

In the use of an automobile during the winter months, it is found that conditions are often such as to cause ice to form on the outer surface of the windshield thus obscuring the vision of the driver and causing the driving of the machine to be dangerous, and in order to prevent the formation of ice on that portion of the windshield thru which the driver directs his vision and particularly that area over which the windshield wiper is arranged to operate, I have formed a device which may be attached to the windshield of any automobile, without drilling, riveting or disfiguring any of the parts and be completely detached from position, by which the desired portion of the windshield may be heated sufficiently to prevent moisture from freezing on its outer surface and obstructing the vision of the operator; and the following is a detailed description of the present embodiment of this invention and illustrating the preferred means by which these advantageous results may be accomplished:

With reference to the drawings, 10 designates the automobile windshield over the outer surface of which a windshield wiper 11 is designed to act. In order that the area of the windshield over which the wiper acts may be heated, I position a heating element 15 in the form of a wire in contact with the inner surface of the windshield or transparent material 10 and arrange the same in a zigzag manner back and forth along the area to be heated and I cover this heating element with a transparent member 12 and border it with a piece of felt or other suitable cushioning means of sufficient thickness to space the member 12 from the transparent material or windshield 10 and form therewith a compartment 14 which confines the air which itself becomes heated and prevents cooling of the heating element inclosed in the compartment.

The wire or heating element 15 is mounted by means of a pair of binding posts 16 upon the member 12 formed of glass and from these supports a pair of lead wires 17 and 18 extend and are housed in the border 13, each being provided with a pair of spring clips 19 to connect the heating element 15 in the electric circuit. I have found that one of the clips 19 may engage the ammeter 20 and the other clip engage a ground 21 which will cause a current from an electric circuit of the automobile to pass thru. The heating element 15 is of sufficient resistance to cause it to be raised in temperature and as this heating element is in contact with the glass windshield 10, its heat is transmitted thereto to warm the same sufficiently to prevent ice from freezing on its outer surface and as this element is confined within the compartment 14 it is prevented from being cooled by the circulating air in the automobile and thus the device requires but the minimum amount of current for successful operation.

The transparent member forming the compartment is secured to the inner surface of the windshield in any suitable manner that preferred being by means of a rubber suction cup 21 provided with metal fingers 22 to overlay the felted bordering edge 13 and press and hold the same in position tightly against the inner surface of the windshield.

It will be observed that the suction cup may be secured to the windshield at any point along its surface and may be completely detached to permit complete detachment of the device from operating position and thus the device when not desired to be used, as during the majority of the operation of the automobile, may be stored in any convenient location and no unsightly parts for attachment need be permanently secured to the automobile for mounting the same.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A device for preventing ice from forming on the outside surface of an automobile windshield or the like, comprising a sheet of glass, a felt border within which the edge of the glass is inset having a substantial thickness to space the glass from the inside surface of the windshield and form a hollow compartment therewith, a self supporting resistor mounted at its opposite ends on said glass and disposed in a zigzag relation within said compartment over and in contact with the inner surface of the windshield, connecting leads from the opposite ends of said wire and provided with clips adapted to be readily secured to portions of an automobile to connect the wire in an electric circuit, and readily removable suction cups having fingers to engage and hold said glass and border in position on the windshield.

In testimony whereof I affix my signature.

FREDERICK G. HALBIG.